(12) United States Patent
Tan et al.

(10) Patent No.: US 12,080,999 B2
(45) Date of Patent: Sep. 3, 2024

(54) RAILWAY VEHICLE AND STORAGE BATTERY CIRCUIT BREAKER BOX THEREOF

(71) Applicant: CRRC TANGSHAN CO., LTD., Tangshan (CN)

(72) Inventors: Mu Tan, Tangshan (CN); Junbin Mu, Tangshan (CN); Xiaojun Li, Tangshan (CN); Jiecun Geng, Tangshan (CN); Fanwei Jiang, Tangshan (CN); Ying Liu, Tangshan (CN); Yanxiang Liu, Tangshan (CN)

(73) Assignee: CRRC TANGSHAN CO., LTD., Tangshan (CN)

( * ) Notice: Subject to any disclaimer, the term of this patent is extended or adjusted under 35 U.S.C. 154(b) by 274 days.

(21) Appl. No.: 17/825,200

(22) Filed: May 26, 2022

(65) Prior Publication Data

US 2022/0285923 A1 Sep. 8, 2022

Related U.S. Application Data

(63) Continuation of application No. PCT/CN2019/125357, filed on Dec. 13, 2019.

(30) Foreign Application Priority Data

Nov. 29, 2019 (CN) .......................... 201911200063.0

(51) Int. Cl.
*H01M 10/42* (2006.01)
*B61C 17/00* (2006.01)
(Continued)

(52) U.S. Cl.
CPC ............... *H02B 1/48* (2013.01); *B61C 17/00* (2013.01); *H01M 10/425* (2013.01); *H02B 1/28* (2013.01)

(58) Field of Classification Search
CPC .. H02B 1/28; H02B 1/48; H02G 3/08; H01M 10/425
See application file for complete search history.

(56) References Cited

FOREIGN PATENT DOCUMENTS

| CN | 205406971 U | 7/2016 |
|---|---|---|
| CN | 205489126 U | 8/2016 |
| | (Continued) | |

OTHER PUBLICATIONS

International Search Report issued in corresponding PCT Application No. PCT/CN2019/125357, dated Sep. 1, 2020.
(Continued)

*Primary Examiner* — Robert J Hoffberg
(74) *Attorney, Agent, or Firm* — Westbridge IP LLC

(57) ABSTRACT

Disclosed are a railway vehicle and a storage battery circuit breaker box thereof. The storage battery circuit breaker box comprises a circuit breaker box body, where mounting bases are arranged on side walls of the circuit breaker box body; a mounting positioning plate and a waterproof protection plate are fixedly mounted on a surface of one side of the circuit breaker box body; the mounting positioning plate is of a rectangular annular structure with an opening provided in the bottom thereof; the waterproof protection plate is located at the inner side of the mounting positioning plate; the waterproof protection plate is of a door-shaped structure; and perspective windows and a switch mounting hole are provided at the circuit breaker box body. The circuit breaker box can be mounted inside a vehicle body, maintenance by maintenance personnel outside the vehicle is facilitated, and the sealing requirements can also be met.

20 Claims, 6 Drawing Sheets

(51) Int. Cl.
 *H02B 1/28* (2006.01)
 *H02B 1/48* (2006.01)

(56) References Cited

FOREIGN PATENT DOCUMENTS

| | | | | |
|---|---|---|---|---|
| CN | 205566880 U | 9/2016 | | |
| CN | 108016387 A | 5/2018 | | |
| CN | 108695732 A | 10/2018 | | |
| CN | 108988161 A | 12/2018 | | |
| CN | 209016625 U | 6/2019 | | |
| CN | 209169727 U | 7/2019 | | |
| CN | 209183960 U | 7/2019 | | |
| JP | H09204841 A | * | 10/2015 | ............... H02G 9/00 |
| JP | 6176989 B2 | 8/2017 | | |
| KR | 101556932 B1 | * | 8/1997 | |
| PH | 22016000636 U1 | * | 9/2016 | |

OTHER PUBLICATIONS

First Office Action issued in counterpart Chinese Patent Application No. 201911200063.0, dated Sep. 28, 2021.
Written Opinion issued in corresponding PCT Application No. PCT/CN2019/125357, dated Sep. 1, 2020.

* cited by examiner

RAILWAY VEHICLE AND STORAGE BATTERY CIRCUIT BREAKER BOX THEREOF

CROSS-REFERENCE TO RELATED APPLICATIONS

This application is a continuation of International Application PCT/CN2019/125357, filed on Dec. 13, 2019, which claims priority to Chinese Patent Application No. 201911200063.0, filed Nov. 29, 2019, the entire contents of which are incorporated herein by reference.

TECHNICAL FIELD

The present application relates to the field of railway vehicle technologies, and in particular, to a railway vehicle and a storage battery circuit breaker box thereof.

BACKGROUND

In order to guarantee the safety performance of emergency battery power supply, a relevant railway vehicle is additionally provided with a circuit breaker for a storage battery. The circuit breaker is required to be provided close to a storage battery box, but an isolation space is required therebetween, so as to avoid explosion of combustible gas (hydrogen and oxygen) released by the storage battery caused by a spark of the circuit breaker. The relevant circuit breaker is generally mounted nearby the storage battery box by a circuit breaker box, and the storage battery box is mounted on a vehicle chassis; since the circuit breaker box is mounted below a vehicle body chassis, even if a skirt plate is provided on a side of the railway vehicle and has a certain protective effect, it is still necessary to consider the sealing performance of a circuit breaker box body in the case of vehicle operation.

Since the circuit breaker box of a double-deck stainless steel vehicle is required to be mounted inside a vehicle body, and meanwhile to facilitate maintenance of the circuit breaker by maintenance personnel outside the vehicle, the structure of the relevant circuit breaker box may not meet the requirements, and the circuit breaker box is required to be redesigned to meet the maintenance and sealing requirements of the storage battery.

SUMMARY

Embodiments of the present application provide a railway vehicle and a storage battery circuit breaker box thereof; the circuit breaker box can be mounted inside a vehicle body, maintenance by maintenance personnel outside the vehicle is facilitated, and the sealing requirements can also be met.

According to a first aspect of the embodiments of the present application, there is provided a storage battery circuit breaker box, including a circuit breaker box body; where a plurality of mounting bases are arranged on side walls of the circuit breaker box body; a mounting positioning plate and a waterproof protection plate are fixedly mounted on a surface of one side of the circuit breaker box body; the mounting positioning plate is of a rectangular annular structure with an opening provided in the bottom thereof; the waterproof protection plate is located at the inner side of the mounting positioning plate; the waterproof protection plate is of a door-shaped structure and includes a top plate and vertical plates fixedly connected to two ends of the top plate; and perspective windows and a switch mounting hole are provided at the positions, on the inner side of the waterproof protection plate, of the circuit breaker box body.

In some optional implementations, the top plate is obliquely provided on a surface of the circuit breaker box body with one end higher and the other end lower; and the waterproof protection plate has a greater thickness than the mounting positioning plate.

In some optional implementations, the mounting positioning plate is fixedly mounted on the circuit breaker box body by fasteners; and the waterproof protection plate is welded onto the circuit breaker box body.

In some optional implementations, the mounting positioning plate protrudes from the surface of the circuit breaker box body by a height of 3 mm and has a width of 30 mm; and the waterproof protection plate protrudes from the surface of the circuit breaker box body by a height of 13 mm and has a width of 1 mm.

In some optional implementations, the top plate has a higher left end and a lower right end; the vertical plates include a first vertical plate located at the left end of the top plate and a second vertical plate located at the right end of the top plate; and the first vertical plate has a length of 150 mm, and the second vertical plate has a length of 100 mm.

In some optional implementations, the top plate and the horizontal plane have an included angle of 15°.

In some optional implementations, a plurality of lightening holes are arranged in the mounting positioning plate.

In some optional implementations, the mounting positioning plate and the waterproof protection plate are both made of 304 stainless steel plates; the mounting positioning plate has a side length of 230 mm; and the lightening hole has a length of 40 mm and a width of 10 mm.

In some optional implementations, the plurality of mounting bases are symmetrically arranged on two vertically extending outer side surfaces of the circuit breaker box body.

In some optional implementations, the storage battery circuit breaker box further includes a box cover, and the box cover is rotatably mounted on the side, away from the mounting positioning plate, of the circuit breaker box body.

In addition, according to a second aspect of the embodiments of the present application, there is further provided a railway vehicle, where the railway vehicle includes a vehicle body and a storage battery circuit breaker, and further includes any one of storage battery circuit breaker boxes provided in the above-mentioned technical solutions; the storage battery circuit breaker box is fixedly mounted on the inner side of a side wall of the vehicle body by fasteners penetrating through the mounting bases; the side wall is provided with a window opposite to the storage battery circuit breaker box in position, an access door for opening and closing the window and a side wall flange located on the inner side of the window and corresponding to the mounting positioning plate in position; the side wall flange abuts against the mounting positioning plate, and a gap formed around the mounting positioning plate between the side wall and the circuit breaker box body is filled with sealant; and the storage battery circuit breaker is fixedly mounted in the circuit breaker box body, an indicator lamp of the storage battery circuit breaker is opposite to the perspective window of the circuit breaker box body in position, and a switch of the storage battery circuit breaker is mounted in the switch mounting hole of the circuit breaker box body.

In some optional implementations, a rubber seal is mounted between the switch and the circuit breaker box body.

In some optional implementations, the window is a rectangular opening.

In some optional implementations, the side lengths of the window are all less than or equal to 200 mm.

In some optional implementations, the access door is rotatably mounted on the outer side of the side wall by a hinge mounted at the top.

The adoption of the railway vehicle and the storage battery circuit breaker box thereof according to the embodiments of the present application has the following beneficial effects.

The storage battery circuit breaker box is mounted on a side wall inside the vehicle body by the plurality of mounting bases on the side wall thereof, the surface of the side provided with the mounting positioning plate and the waterproof protection plate is provided towards the exterior of the vehicle, a butt joint is formed between the mounting positioning plate and the side wall flange of the side wall of the vehicle body, and the waterproof protection plate is mounted on the inner side of the mounting positioning plate; the mounting positioning plate can guarantee the sealing effect between the interior of the vehicle body and the external environment, and may also improve the mounting efficiency of the storage battery circuit breaker box, and the waterproof protection plate may ensure that accumulated water flowing down in the process of opening the access door does not drip on the circuit breaker box body, thus preventing an electrical short circuit; meanwhile, the switch and the status indicator lamp of the storage battery circuit breaker may be mounted on the circuit breaker box body through the switch mounting hole and the perspective window, and the maintenance may be performed by opening the access door on the vehicle body. Therefore, with the above-mentioned structure of the above-mentioned storage battery circuit breaker box, the storage battery circuit breaker can be mounted inside the vehicle body, the maintenance by maintenance personnel outside the vehicle is facilitated, and the sealing requirements can also be met.

BRIEF DESCRIPTION OF THE DRAWINGS

The drawings are described here to provide further understanding of the present application, and form a part of the present application. The schematic embodiments and its description of the present application are adopted to explain the present application, and do not form improper limits to the present application. In the drawings.

DETAILED DESCRIPTION OF THE EMBODIMENTS

In order to make the technical solutions and advantages of the embodiments of the present application clearer, the exemplary embodiments of the present application will be described in further detail below with reference to the accompanying drawings, and it is obvious that the described embodiments are only a part of the embodiments of the present application, and are not exhaustive of all the embodiments. It should be noted that the embodiments and features of the embodiments in the present application may be combined with each other without conflict.

Figure 3:
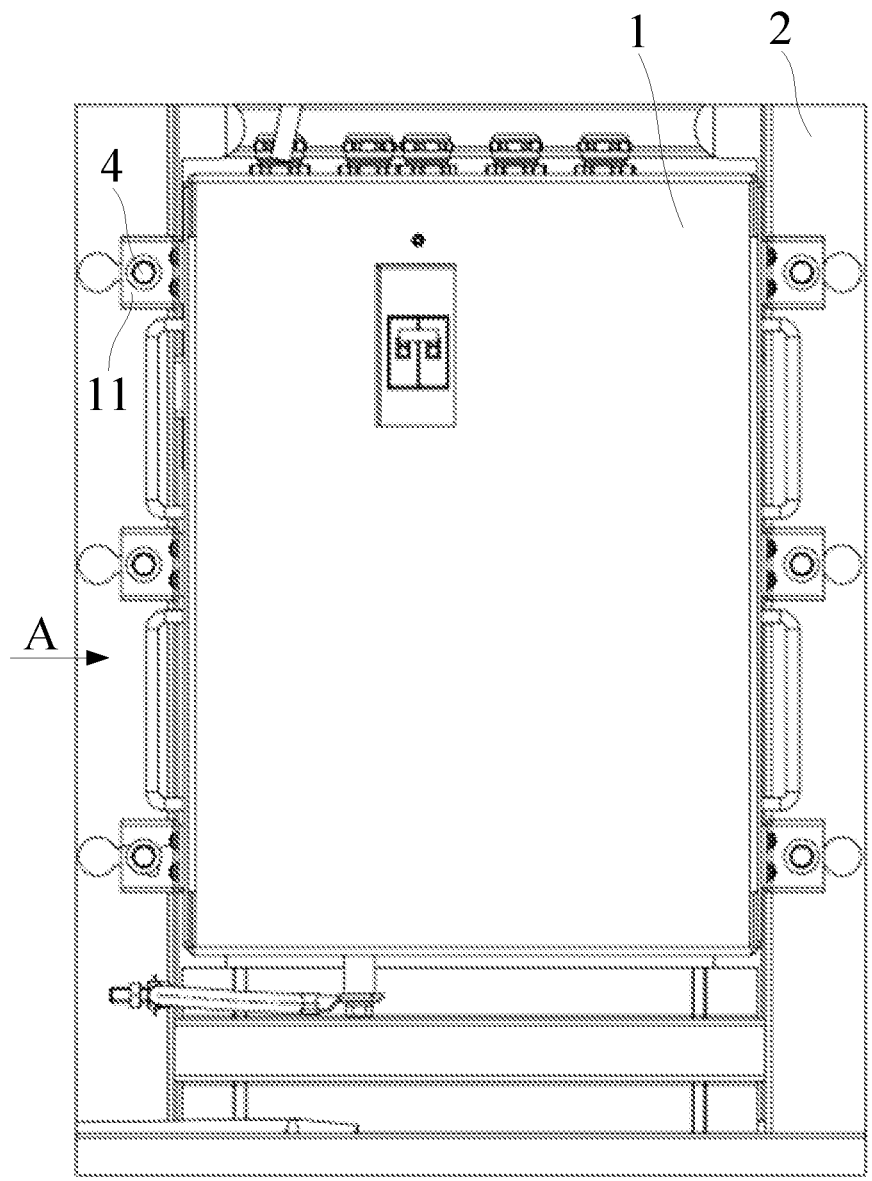
FIG. 3 is a schematic structural diagram of the circuit breaker box body of FIG. 1 mounted in a vehicle body.
Figure 4:
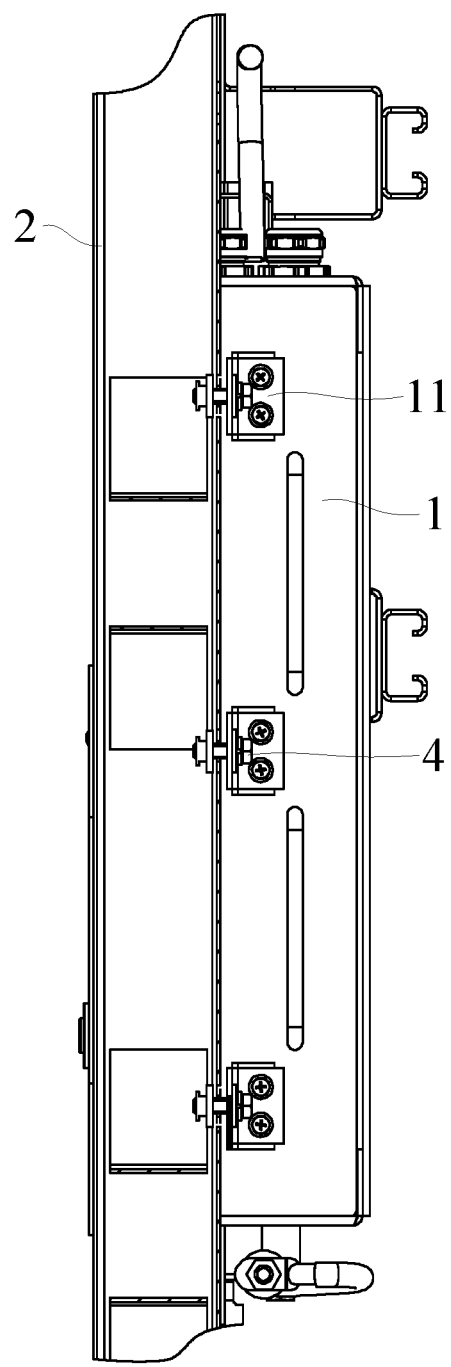
FIG. 4 is a A-direction schematic structural diagram of the circuit breaker box body mounted in the vehicle body provided in FIG. 3.
Figure 5:
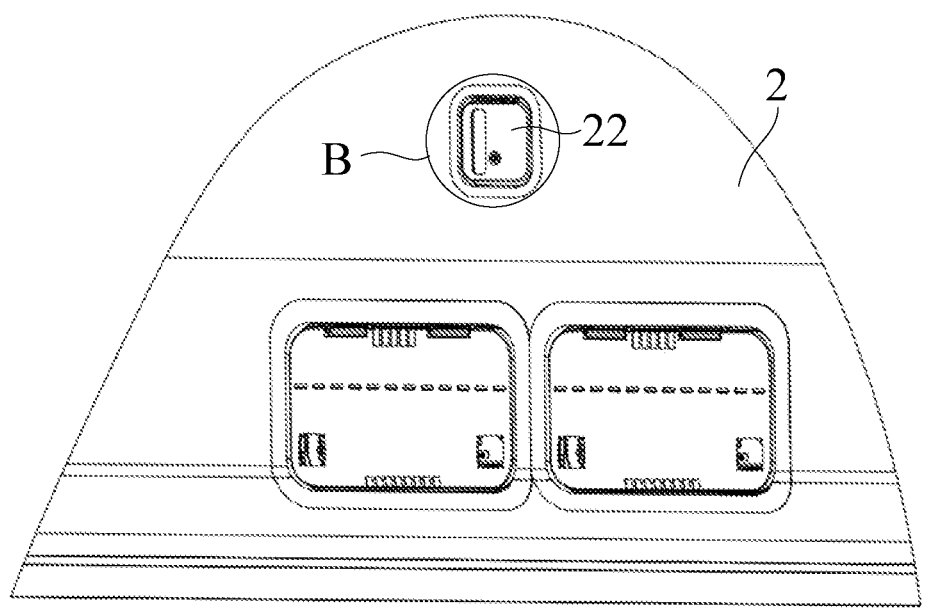
FIG. 5 is a schematic external structural diagram of a vehicle body provided with a circuit breaker box body.
Figure 7:
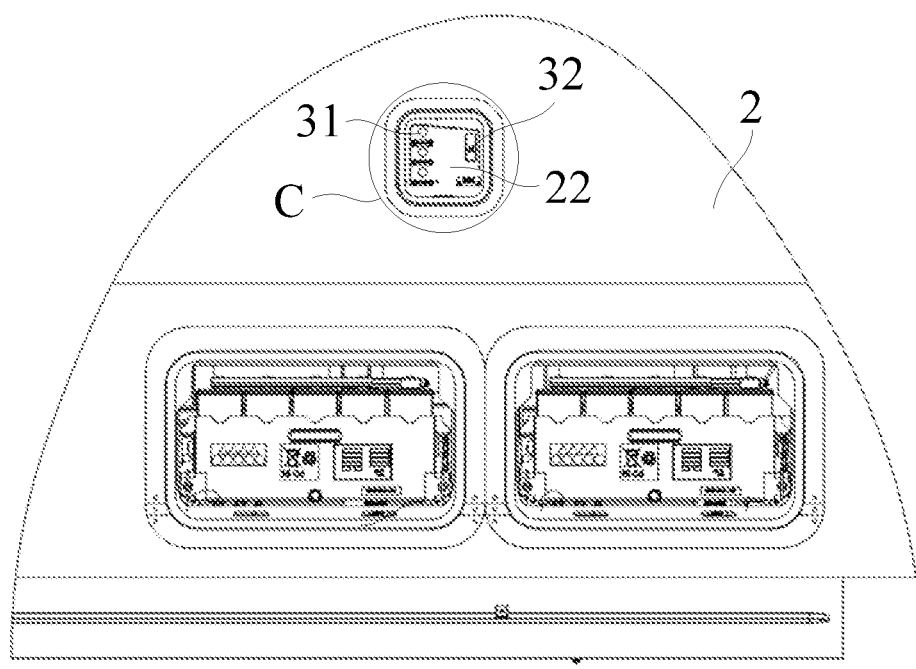
FIG. 7 is a schematic external structural diagram of a vehicle body provided with a circuit breaker box body when an access door is not provided.

An embodiment of the present application provides a railway vehicle, and as shown in the structures of FIGS. 3 and 4, the railway vehicle includes a vehicle body, a storage battery circuit breaker 3 and a storage battery circuit breaker box for accommodating the storage battery circuit breaker 3; as shown in the structures of FIGS. 3 and 4, the storage battery circuit breaker box is mounted on the inner side of a side wall 2 of the vehicle body; and as shown in the structures of FIGS. 5 and 7, the side wall 2 of the vehicle body is provided with a window 21 opposite, in position, to the storage battery circuit breaker box mounted on the inner side of the vehicle body, and an access door 22 capable of being opened and closed is mounted on the window 21.

Figure 1:
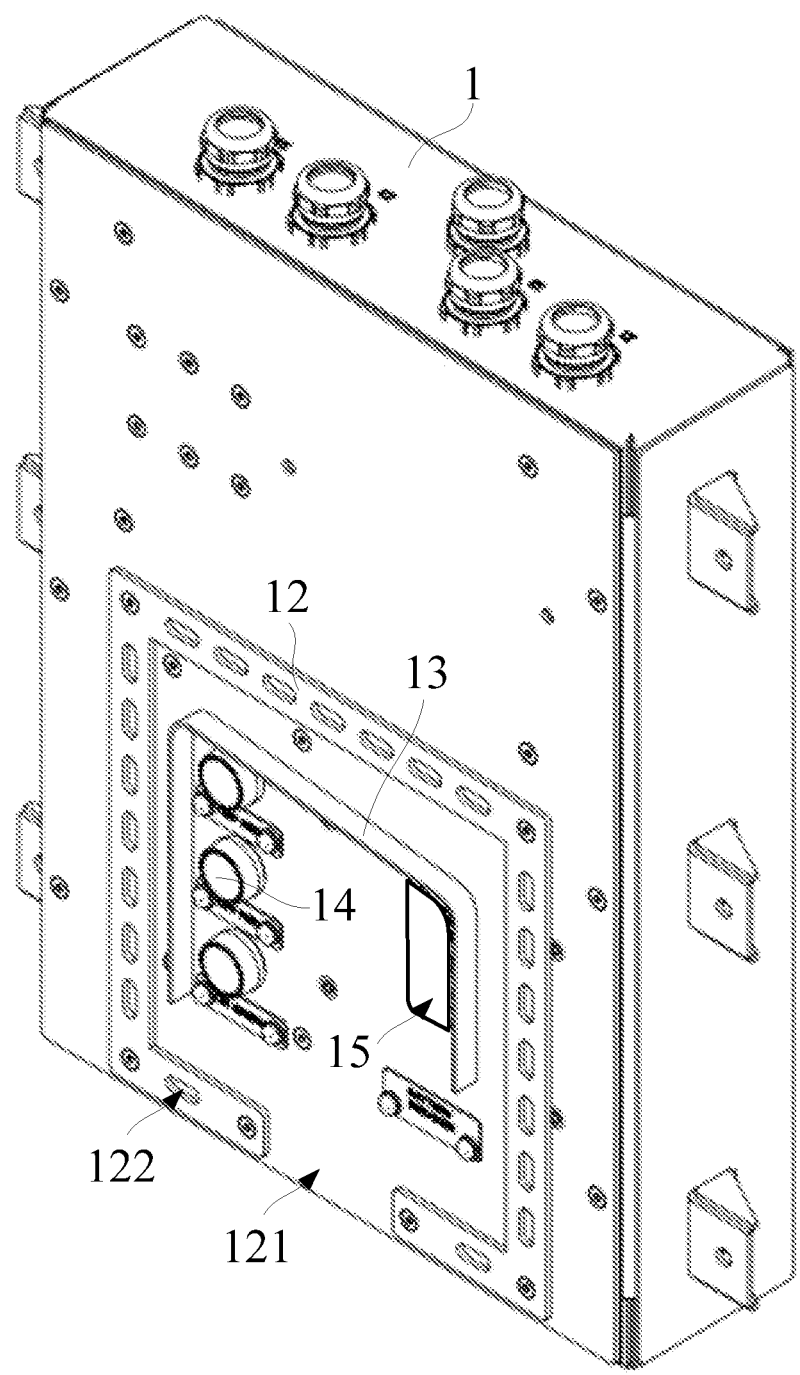
FIG. 1 is a schematic structural diagram of a circuit breaker box body according to an embodiment of the present application.
Figure 2:
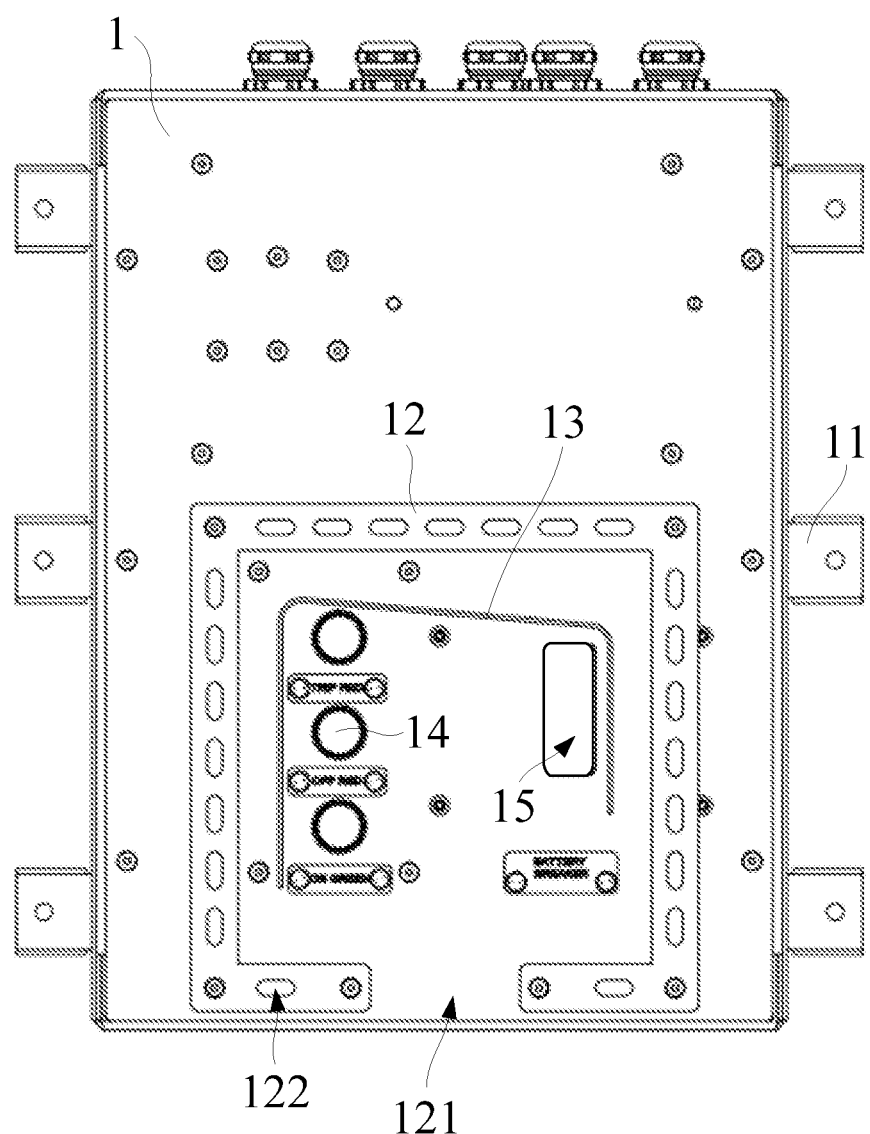
FIG. 2 is a front view of the circuit breaker box body of FIG. 1.
Figure 8:
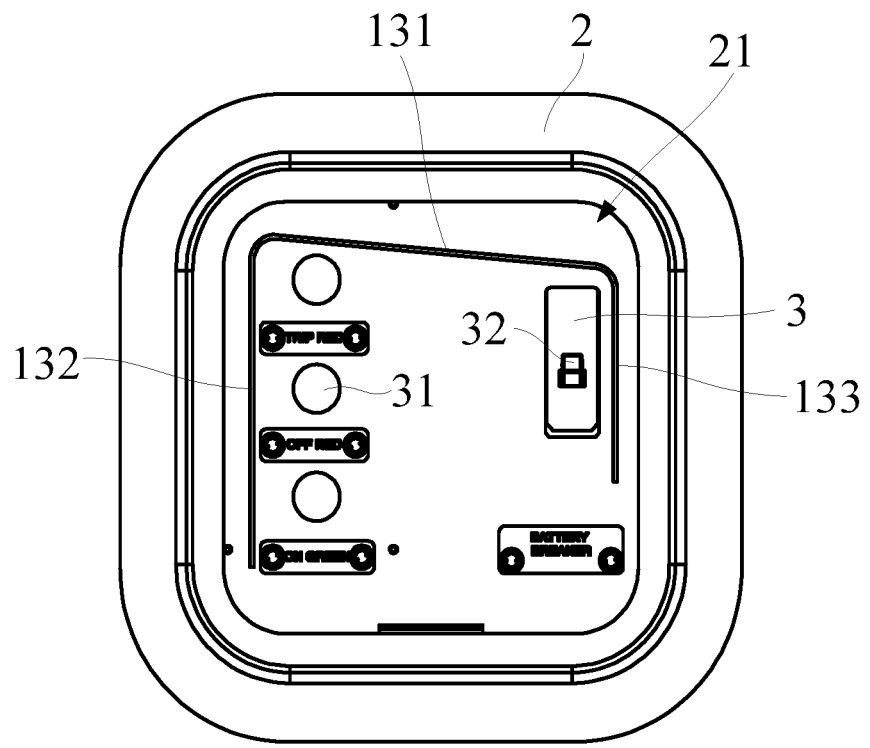
FIG. 8 is a schematic partial enlarged structural diagram of part C in the vehicle body of FIG. 7.

As shown in the structures of FIGS. 1 and 2, the storage battery circuit breaker box includes a circuit breaker box body 1 for accommodating the circuit breaker, and meanwhile, the storage battery circuit breaker box may further include a box cover (not shown in the drawing), and the box cover is rotatably mounted on the side, away from a mounting positioning plate 12, of the circuit breaker box body 1; that is, the box cover is opened towards the inner side of the vehicle body; a plurality of mounting bases 11 are arranged on the side walls of the circuit breaker box body 1, and as shown in the structure of FIG. 2, three mounting bases 11 are arranged on each of the two side walls of the circuit breaker box body 1, and each mounting base 11 is provided with a through hole where a fastener 4 is inserted; as shown in the structures of FIGS. 1 and 2, the mounting positioning plate 12 and a waterproof protection plate 13 are fixedly mounted on a surface of one side of the circuit breaker box body 1; the mounting positioning plate 12 is of a rectangular annular structure with an opening 121 provided in the bottom thereof; the mounting positioning plate 12 protrudes from the surface of the circuit breaker box body 1 by a height of 3 mm and has a width of 30 mm; that is, in the structure shown in FIG. 1, the height of the mounting positioning plate 12 is the size in the same direction as the thickness of the circuit breaker box body 1, i.e., the height of the mounting positioning plate 12 extending from the surface of the circuit breaker box body 1 towards the side away from the circuit breaker box body 1; the width of the mounting positioning plate 12 refers to the size of the top edge or the bottom edge of the mounting positioning plate 12 in the vertical direction, or the size of the vertical edge of the mounting positioning plate 12 in the width direction of the circuit breaker box body 1; the waterproof protection plate 13 is located on the inner side of the mounting positioning plate 12; that is, as shown in the structures of FIGS. 1 and 2, the waterproof protection plate 13 is located inside a space enclosed by the mounting positioning plate 12; the waterproof protection plate 13 is of a door-shaped structure, and as shown in the structure of FIG. 8, includes a top plate 131 and vertical plates fixedly connected to two ends of the top plate 131; perspective windows 14 and a switch mounting hole 15 are provided at the positions, on the inner side of the waterproof protection plate 13, of the circuit breaker box body 1; the perspective window 14 is used for a status indicator lamp 31 of the circuit breaker, such that light emitted by the status indicator lamp 31 can be transmitted through the perspective window 14, and the switch mounting hole 15 is used for a switch 32 of the circuit breaker, such that the switch 32 of the circuit breaker can be exposed from the circuit breaker box body 1, and therefore may be operated outside the vehicle without entrance into the vehicle.

The waterproof protection plate 13 protrudes from the surface of the circuit breaker box body 1 by a height of 13 mm and has a width of 1 mm; the height of the waterproof protection plate 13 is the size in the same direction as the thickness of the circuit breaker box body 1, i.e., the height of the waterproof protection plate 13 extending from the surface of the circuit breaker box body 1 towards the side away from the circuit breaker box body 1; and the width of the waterproof protection plate 13 refers to the size of the top plate 131 of the waterproof protection plate 13 in the vertical direction, or the sizes of a first vertical plate 132 and a second vertical plate 133 of the waterproof protection plate 13 in the width direction of the circuit breaker box body 1.

The storage battery circuit breaker box is fixedly mounted on the inner side of the side wall 2 of the vehicle body by fasteners 4 penetrating through the mounting bases 11, and as shown in the structures of FIGS. 3 and 4, the storage battery circuit breaker box is fixedly mounted on the inner side of the side wall 2 of the vehicle body and mounted on the side wall 2 by the fasteners 4, such as screws, bolts, or the like, penetrating through the mounting bases 11; as shown in the structures of FIGS. 5, 6, 7 and 8, the side wall 2 is provided with the window 21 opposite to the storage battery circuit breaker box in position, the access door 22 for opening and closing the window 21 and a side wall flange 23-located on the inner side of the window 21 and corresponding to the mounting positioning plate 12 in position; the surface of the side of the circuit breaker box body 1 provided with the perspective window 14 can be exposed out of the vehicle body from the inner side of the vehicle body through the window 21 provided on the side wall 2 of the vehicle body, and the indicator lamp 31 of the circuit breaker can be observed outside the vehicle; the window 21 may be covered with the access door 22 mounted at the window 21, such that the circuit breaker box body 1 provided with the circuit breaker is mounted inside the vehicle body; and the side wall flange 23-abuts against the mounting positioning plate 12, a gap formed around the mounting positioning plate 12 between the side wall 2 and the circuit breaker box body 1 is filled with sealant, and the mounting positioning plate 12 may ensure that the sealant is even and full, thus guaranteeing the good sealing performance between the interior of the vehicle body and the external environment.

The storage battery circuit breaker 3 is fixedly mounted in the circuit breaker box body 1, the indicator lamp 31 of the storage battery circuit breaker 3 is opposite to the perspective window 14 of the circuit breaker box in position, and the switch 32 of the storage battery circuit breaker 3 is mounted in the switch mounting hole 15 of the circuit breaker box body 1; the storage battery circuit breaker 3 is mounted in the circuit breaker box body 1, the indicator lamp 31 of the circuit breaker is opposite to the perspective window 14 in the circuit breaker box body 1, and the switch 32 of the storage battery circuit breaker 3 is exposed out of the circuit breaker box body 1 through the switch mounting hole 15 of the circuit breaker box body 1, such that the indication state of the indicator lamp 31 of the circuit breaker may be directly observed through the perspective window 14 in the circuit breaker box body 1, and the switch 32 of the storage battery circuit breaker 3 may be controlled outside the circuit breaker box body 1.

The above-mentioned storage battery circuit breaker box is mounted on the inner side of the side wall 2 of the vehicle body, and the surface of the side of the circuit breaker box body 1 provided with the perspective window 14 and the switch mounting hole 15 can be exposed out of the vehicle body through the window 21 and the access door 22 which are arranged on the side wall 2, such that when the access door 22 is opened outside the vehicle body, the state of the storage battery circuit breaker 3 can be checked and the storage battery circuit breaker 3 can be controlled by the switch 32. The circuit breaker box body 1 is mounted on the inner side of the side wall 2 of the vehicle body by the plurality of mounting bases 11 on the side wall, the surface of the side provided with the mounting positioning plate 12 and the waterproof protection plate 13 is mounted towards the exterior of the vehicle, a butt joint is formed between the mounting positioning plate 12 and the side wall flange of the side wall 2 of the vehicle body, and the waterproof protection plate 13 is mounted on the inner side of the mounting positioning plate 12; the mounting positioning plate 12 can guarantee the sealing effect between the interior of the vehicle body and the external environment, and may also improve the mounting efficiency of the storage battery circuit breaker box, and the waterproof protection plate 13 may ensure that accumulated water flowing down in the process of opening the access door 22 does not drip on the circuit breaker box body 1, thus preventing an electrical short circuit; meanwhile, the switch 32 and the status indicator lamp 31 of the storage battery circuit breaker 3 may be mounted on the circuit breaker box body 1 through the switch mounting hole 15 and the perspective window 14, and the maintenance may be performed by opening the access door 22 on the vehicle body. Therefore, with the above-mentioned structure of the above-mentioned storage battery circuit breaker box, the storage battery circuit breaker 3 can be mounted inside the vehicle body, the maintenance by maintenance personnel outside the vehicle is facilitated, and the sealing requirements can also be met.

In a specific embodiment, a rubber seal (not shown in the drawing) is mounted between the switch 32 and the circuit breaker box body 1, and when the storage battery circuit breaker 3 is mounted in the circuit breaker box body 1, the switch 32 is exposed out of the circuit breaker box body 1 through the switch mounting hole 15 of the circuit breaker box body 1, and the sealing effect between the switch 32 and the circuit breaker box body 1 can be improved by the rubber seal, such as a rubber sealing strip, mounted between the switch 32 and the circuit breaker box body 1.

As shown in the structures of FIGS. 7 and 8, the window 21 formed in the vehicle body is a rectangular opening, the window 21 may be a square opening, and the side lengths of the window 21 are all less than or equal to 200 mm. Since the strength grade of the vehicle body is reduced by additionally forming a hole in the side wall 2 of the vehicle body, in order to reduce the influence of the formed hole on the static strength of the vehicle body, the formed window 21 has a size limited within the size range of 200 mm×200 mm, and meets the waterproof sealing requirements.

Figure 6:
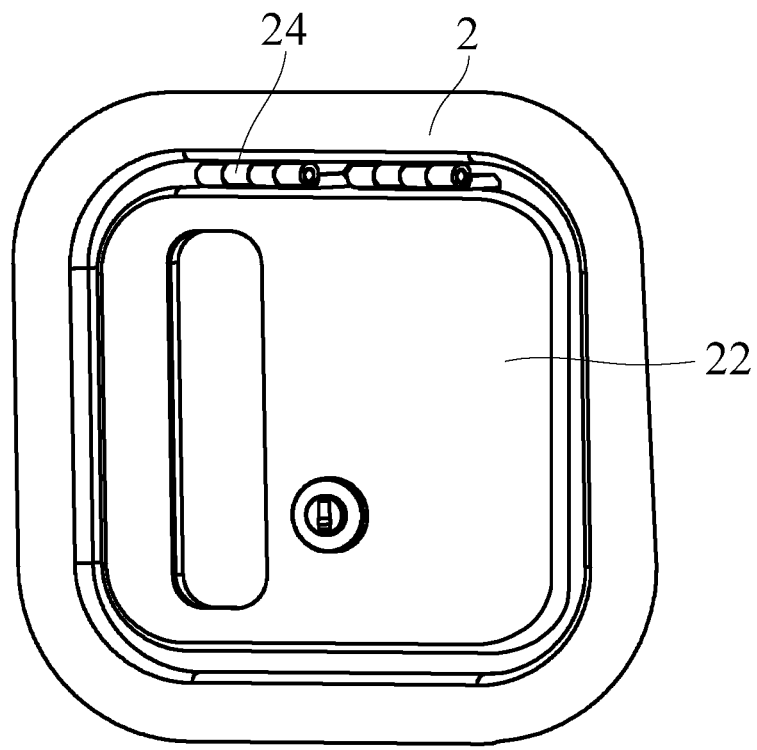
FIG. 6 is a schematic partial enlarged structural diagram of part B in the vehicle body of FIG. 5.

As shown in the structures of FIGS. 5 and 6, the access door 22 is rotatably mounted on the outer side of the side wall 2 by a hinge 24 mounted at the top.

As shown in the structures of FIGS. 2 and 8, the top plate 131 is obliquely provided on the surface of the circuit breaker box body 1 with one end higher and the other end lower; and the waterproof protection plate 13 has a greater thickness than the mounting positioning plate 12. As shown in the structure of FIG. 2, the top plate 131 of the waterproof protection plate 13 has a higher end on the left side of the page and a lower end on the right side of the page, such that the top plate 131 is inclined, and the top plate 131 and the horizontal plane may have an included angle of 15°; and the thickness of the waterproof protection plate 13 and the thickness of the mounting positioning plate 12 both refer to the sizes in the direction perpendicular to the page.

As shown in the structure of FIG. 2, the mounting positioning plate 12 may be fixedly mounted on the circuit breaker box body 1 by the fasteners 4, such as screws, rivets, or the like; the waterproof protection plate 13 is welded onto the circuit breaker box body 1.

As shown in the structure of FIG. 1, the mounting positioning plate 12 protrudes from the surface of the circuit breaker box body 1 by a height of 3 mm and has a width of 30 mm; that is, in the structure shown in FIG. 1, the height of the mounting positioning plate 12 is the size in the same direction as the thickness of the circuit breaker box body 1, i.e., the height of the mounting positioning plate 12 extending from the surface of the circuit breaker box body 1 towards the side away from the circuit breaker box body 1; the width of the mounting positioning plate 12 refers to the size of the top edge or the bottom edge of the mounting positioning plate 12 in the vertical direction, or the size of the vertical edge of the mounting positioning plate 12 in the width direction of the circuit breaker box body 1; the waterproof protection plate 13 protrudes from the surface of the circuit breaker box body 1 by a height of 13 mm and has a width of 1 mm; the height of the waterproof protection plate 13 is the size in the same direction as the thickness of the circuit breaker box body 1, i.e., the height of the waterproof protection plate 13 extending from the surface of the circuit breaker box body 1 towards the side away from the circuit breaker box body 1; and the width of the waterproof protection plate 13 refers to the size of the top plate 131 of the waterproof protection plate 13 in the vertical direction, or the sizes of the first vertical plate 132 and the second vertical plate 133 of the waterproof protection plate 13 in the width direction of the circuit breaker box body 1. The top plate 131 has a higher left end and a lower right end; the vertical plates include the first vertical plate 132 located at the left end of the top plate 131 and the second vertical plate 133 located at the right end of the top plate 131; and the first vertical plate 132 has a length of 150 mm, the second vertical plate 133 has a length of 100 mm, and as shown in the structure of FIG. 8, the length of the first vertical plate 132 and the length of the second vertical plate 133 both refer to the sizes of the first vertical plate 132 and the second vertical plate 133 in the vertical direction in the page.

In order to reduce the weight of the whole vehicle while meeting the strength requirement, as shown in the structures of FIGS. 1 and 2, a plurality of lightening holes 122 are arranged in the mounting positioning plate 12, the lightening hole 122 has a length of 40 mm and a width of 10 mm, the length of the lightening hole 122 is the size in the extending direction of the mounting positioning plate 12, and the width of the lightening hole 122 is the size along the width of the mounting positioning plate 12.

On the basis of the above-mentioned various embodiments, the mounting positioning plate 12 and the waterproof protection plate 13 may be both made of 304 stainless steel plates; and the mounting positioning plate 12 may have a side length of 230 mm.

As shown in the structures of FIGS. 1 and 2, the plurality of mounting bases 11 are symmetrically arranged on two vertically extending outer side surfaces of the circuit breaker box body 1. The number and position of the mounting bases 11 may be determined according to actual conditions.

Although some optional embodiments of the present application have been described, persons skilled in the art can make additional changes and modifications to these embodiments once they learn the basic inventive concept. Therefore, the following claims are intended to be construed as encompassing the optional embodiments and all changes and modifications falling within the scope of the present application.

Obviously, persons skilled in the art can make various modifications and variations to the present application without departing from the spirit and scope of the present application. Thus, the present application is intended to encompass these modifications and variations provided that they fall within the scope of the claims appended to the application and their equivalents.

What is claimed is:

1. A storage battery circuit breaker box, comprising a circuit breaker box body,
   wherein a plurality of mounting bases are arranged on side walls of the circuit breaker box body;
   a mounting positioning plate and a waterproof protection plate are fixedly mounted on a surface of one side of the circuit breaker box body;
   the mounting positioning plate is of a rectangular annular structure with an opening provided in a bottom of the mounting positioning plate;
   the waterproof protection plate is located at an inner side of the mounting positioning plate;
   the waterproof protection plate is of a door-shaped structure and comprises a top plate and vertical plates fixedly connected to two ends of the top plate; and
   perspective windows and a switch mounting hole are provided at positions, on an inner side of the waterproof protection plate, of the circuit breaker box body.

2. The storage battery circuit breaker box according to claim 1, wherein the top plate is obliquely provided on the surface of the one side of the circuit breaker box body with one end higher and another end lower; and
   the waterproof protection plate has a greater thickness than the mounting positioning plate.

3. The storage battery circuit breaker box according to claim 2, wherein the mounting positioning plate is fixedly mounted on the circuit breaker box body by fasteners; and
   the waterproof protection plate is welded onto the circuit breaker box body.

4. The storage battery circuit breaker box according to claim 3, wherein the mounting positioning plate protrudes from the surface of the one side of the circuit breaker box body by a height of 3 mm and has a width of 30 mm; and
   the waterproof protection plate protrudes from the surface of the one side of the circuit breaker box body by a height of 13 mm and has a width of 1 mm.

5. The storage battery circuit breaker box according to claim 4, wherein the top plate has a higher left end and a lower right end;
   the vertical plates comprise a first vertical plate located at the left end of the top plate and a second vertical plate located at the right end of the top plate; and
   the first vertical plate has a length of 150 mm, and the second vertical plate has a length of 100 mm.

6. The storage battery circuit breaker box according to claim 2, wherein the top plate and a horizontal plane of the circuit breaker box body have an included angle of 15°.

7. The storage battery circuit breaker box according to claim 1, wherein a plurality of lightening holes are arranged in the mounting positioning plate.

8. The storage battery circuit breaker box according to claim 7, wherein the mounting positioning plate and the waterproof protection plate are both made of 304 stainless steel plates;
the mounting positioning plate has a side length of 230 mm; and
each of the lightening holes has a length of 40 mm and a width of 10 mm.

9. The storage battery circuit breaker box according to claim 1, wherein the plurality of mounting bases are symmetrically arranged on two vertically extending outer side surfaces of the circuit breaker box body.

10. The storage battery circuit breaker box according to claim 1, further comprising a box cover, wherein the box cover is rotatably mounted on a side of the circuit breaker box body away from the mounting positioning plate.

11. A railway vehicle, comprising a vehicle body and a storage battery circuit breaker, and further comprising a storage battery circuit breaker box;
wherein the storage battery circuit breaker box comprises a circuit breaker box body;
a plurality of mounting bases are arranged on side walls of the circuit breaker box body; a mounting positioning plate and a waterproof protection plate are fixedly mounted on a surface of one side of the circuit breaker box body;
the mounting positioning plate is of a rectangular annular structure with an opening provided in a bottom of the mounting positioning plate;
the waterproof protection plate is located at an inner side of the mounting positioning plate; the waterproof protection plate is of a door-shaped structure and comprises a top plate and vertical plates fixedly connected to two ends of the top plate; and
perspective windows and a switch mounting hole are provided at positions, on an inner side of the waterproof protection plate, of the circuit breaker box body;
wherein the storage battery circuit breaker box is fixedly mounted on an inner side of a side wall of the vehicle body by fasteners penetrating through the mounting bases;
the side wall is provided with a window opposite to the storage battery circuit breaker box in position, an access door for opening and closing the window;
a gap formed around the mounting positioning plate between the side wall and the circuit breaker box body is filled with sealant; and
the storage battery circuit breaker is fixedly mounted in the circuit breaker box body, an indicator lamp of the storage battery circuit breaker is opposite to the perspective window of the circuit breaker box body in position, and a switch of the storage battery circuit breaker is mounted in the switch mounting hole of the circuit breaker box body.

12. The railway vehicle according to claim 11, wherein a rubber seal is mounted between the switch and the circuit breaker box body.

13. The railway vehicle according to claim 11, wherein the window is a rectangular opening.

14. The railway vehicle according to claim 13, wherein side lengths of the window are all less than or equal to 200 mm.

15. The railway vehicle according to claim 11, wherein the access door is rotatably mounted on an outer side of the side wall by a hinge mounted at a top of the access door.

16. The railway vehicle according to claim 11, wherein the top plate is obliquely provided on the surface of the one side of the circuit breaker box body with one end higher and another end lower; and
the waterproof protection plate has a greater thickness than the mounting positioning plate.

17. The railway vehicle according to claim 11, wherein the mounting positioning plate protrudes from the surface of the one side of the circuit breaker box body by a height of 3 mm and has a width of 30 mm; and
the waterproof protection plate protrudes from the surface of the one side of the circuit breaker box body by a height of 13 mm and has a width of 1 mm.

18. The railway vehicle according to claim 11, wherein a plurality of lightening holes are arranged in the mounting positioning plate.

19. The railway vehicle according to claim 11, wherein the plurality of mounting bases are symmetrically arranged on two vertically extending outer side surfaces of the circuit breaker box body.

20. The railway vehicle according to claim 11, wherein the storage battery circuit breaker box further comprises a box cover, wherein the box cover is rotatably mounted on a side of the circuit breaker box body away from the mounting positioning plate.

\* \* \* \* \*